United States Patent [19]

MacDonald et al.

[11] Patent Number: 4,868,278

[45] Date of Patent: Sep. 19, 1989

[54] AROMATIC COPOLYESTERS

[75] Inventors: William A. MacDonald, Guisborough; Timothy G. Ryan, Upton, both of England

[73] Assignee: Imperial Chemical Industries PLC, London, England

[21] Appl. No.: 143,704

[22] Filed: Jan. 14, 1988

[30] Foreign Application Priority Data

Jan. 16, 1987 [GB] United Kingdom ............... 8700923

[51] Int. Cl.$^4$ ..................... C08G 12/00; C08G 63/68
[52] U.S. Cl. ................................... 528/288; 528/294; 528/305
[58] Field of Search ............... 528/305, 294, 288

[56] References Cited

U.S. PATENT DOCUMENTS

| 4,618,699 | 10/1986 | Fialla ............................ 528/305 |
| 4,652,591 | 3/1987 | Londrigan ..................... 528/305 |
| 4,732,959 | 3/1988 | Otani et al. .................... 528/288 |

FOREIGN PATENT DOCUMENTS

| 102094 | 9/1976 | Japan ............................ 528/305 |
| 091119 | 5/1984 | Japan ............................ 528/305 |
| 069138 | 4/1985 | Japan ............................ 528/305 |
| 106832 | 6/1985 | Japan ............................ 528/305 |

*Primary Examiner*—Morton Foelak
*Assistant Examiner*—Dennis R. Daley
*Attorney, Agent, or Firm*—Cushman, Darby & Cushman

[57] ABSTRACT

Melt processable, aromatic copolyesters containing 15 to 40 mole % of 4-oxybenzoyl moieties from 0.25 to less than 2.5 mole % of randomizing moieties, which are preferably 2-6 oxy naphthoyl moieties, the balance of moieties being equimolar proportions of moieties derived from hydroquinone and isophthalic acid. The preferred polymers are made by a dispersion polymerization process using as a dispersion aid a finely divided particulate material having at least 95% by weight of particles with at least one dimension less than 1 micron.

10 Claims, No Drawings

AROMATIC COPOLYESTERS

This invention relates to aromatic copolyesters, particularly such copolyesters which are capable of forming an anisotropic melt.

Extensive studies have been carried out in the past on aromatic copolyestrs, the emphasis more recently being to provide polymers having the ability to form anisotropic melts. The latter have also been termed thermotropic polymers and liquid crystalline polymers. Although numerous examples of such polymers have been devised, in general they require the inclusion of significant amounts of relatively expensive reactants if the most desirable combinations of properties are to be achieved.

Copolyesters have now been devised which maximise the use of inexpensive monomers but which have an excellent combination of properties such as strength and stiffness whilst having good processability in the melt. The compositions of the invention include compositions which are not wholly liquid crystalline in nature.

Accordingly there is provided a melt processable aromatic copolyester comprising moieties I, II and III having the structural formulae

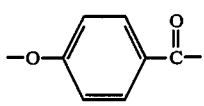   I

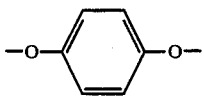   II

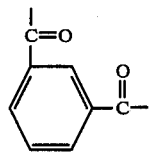   III and at least one moiety IV selected from those of formula

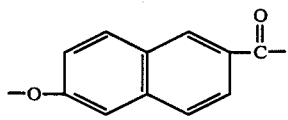

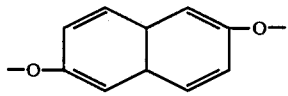

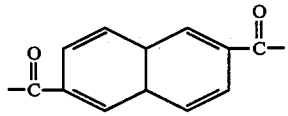

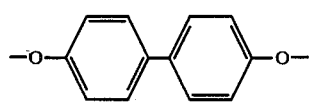

-continued

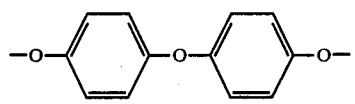

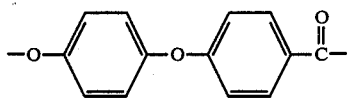

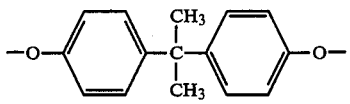

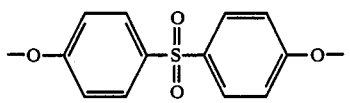

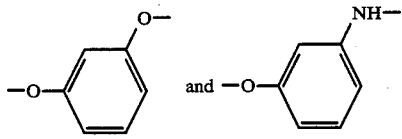

wherein the polyester comprises at least 15 mole %, preferably at least 20 mole % and more desirably at least 27 mole %, and less than 40 mole % of moieties I, at least 57.5 mole % and less than 84.75 of moieties II and III taken together, the number of moieties II being substantially equal to the number of moieties III and at least 0.25 mole % and less than 2.5 mole % of moieties IV.

U.S. Pat. No. 3 637 595 describes aromatic copolyesters of 4-hydroxybenzoic acid, hydroquinone and isophthalic acid having relatively high melting points. The introduction of a fourth copolymerized unit into these copolyesters has been described in the following patent specifications.

U.S. patent specification No. 4 370 466 describes copolyesters containing 40 to 70 mole % of moieties II and III taken together and about 2.5 to 15 mole % of 6-oxy-2-napthoyl moieties. These relatively high concentrations of 6-oxy-2 naphthoyl moieties are added in order to improve the thermal stability of polymers containing at least 40 mole % of 4-oxy benzoyl units, preferably 60 to 70 mole % of such units.

European Patent Publication No. 102 160 describes copolyesters containing 20 to 70 mole % of 4-oxybenzoyl units, from 7.5 to 38.5 mole % of dioxyaryl moieties, from 7.5 to 38.5 mole % of dicarboxyaryl moieties and from 3 to 15 mole % of 6-oxy-2-naphthoyl units. The latter moiety is provided at the concentrations specified in order to reduce the melting temperature of the copolyester in comparison with a copolyester consisting solely of the other three moieties. The preferred compositions of EP 102 160 contain the dicarboxy aryl moieties in the form of a mixture of isophthalic acid and terephthalic acid in the mole proportions 4 to 9 of the isophthaloyl moiety to 6 to 1 of the terephthaloyl moiety. An alternative preferred embodiment contains a dicarboxyaryl moiety which is wholly terephthalic acid in conjunction with a 4,4'-dioxy biphenyl moiety (the dioxyaryl moiety).

U.S. patent specification No. 4 377 681 describes copolyesters consisting of 10 to 40 mole % of 4-oxybenzoyl radicals, isophthaloyl moieties and a mixture of dioxyaryl radicals derived from hydroquinone and 2,2-bis(4-hydroxyphenyl) propane wherein the hydroquinone derived units are 82 to 95 mole % of the total of dioxyaryl radicals.

The copolyester compositions of the present invention show remarkably improved processability in comparison with the copolyesters consisting solely of moieties I, II and III, despite the low levels of moiety IV present. The preferred levels of moiety IV are between 0.5 and 2.0 mole percent. Furthermore, providing such compositions contain at least 27 mole % of moiety I the compositions exhibit fully liquid crystalline melts. In addition, by comparison with compositions which contain more than 40 mole % of 4-oxybenzoyl units the present compositions have a good retention of stiffness at elevated temperature even though the compositions contain up to 2.5 mole % randomising units (Moiety IV) i.e. units which are likely to reduce the ability of the polymer to crystallise. This overall balance of enhanced properties is achieved using a minimum of the more expensive moieties.

Although compositions containing more than 2.5 mole % of moiety IV will also have reduced melting points and improved processability this will only be obtained at the expense of a reduced ability to retain stiffness at elevated temperatures. Compositions containing 5 mole % of 2,6-oxynaphthoyl moieties lack the crystallinity which is characteristic of materials containing less than 2.5 mole % of 2,6-oxynaphthoyl moieties having good retention of stiffness at elevated temperatures.

The compositions of the invention containing less than 27 mole % of moiety I generally exhibit biphasic melts in which the polymer melt is present in both isotropic and anisotropic form.

The copolyesters of the invention may be prepared by the conventional polymerisation techniques known for preparing polyesters in the melt. These generally involve heating a stirred mixture of reactants, appropriate for giving the specified moieties in the polymer, under nitrogen and continuing the heating, with removal of volatile condensation by-products, until a desired molecular weight has been achieved. At the molecular weights required to give the polymer optimum mechanical properties the melt may become so viscous that stirring becomes difficult and discharge of the melt from the stirred vessel also becomes a problem.

In a preferred process these problems have been substantially reduced by the provision of a dispersion polymerisation process which enables high molecular weight material to be produced without difficulty and the mechanical properties to be optimised. This process is the subject of a copending patent application. The process consists of polymerising a monomer or monomers in an inert organic liquid medium, in which the polymer formed from the monomer or monomers is insoluble, comprising dispersing the monomer or monomers in the organic liquid in the presence of a finely, divided particulate material comprising an inorganic portion insoluble in the organic liquid medium and in combination therewith, preferably by covalent or ionic bonding, hydrocarbon chains containing at least 8 carbon atoms, the hydrocarbon chains being soluble in the organic liquid medium and heating the mixture to polymerise the monomer or monomers to a required degree of polymerisation.

The particulate material should be in a state of fine subdivision in order to be effective as a dispersing aid in the polymerisation process. At least 95% by weight of the particulate material should have at least one dimension which is less than 1 micron and preferably less than 0.1 micron.

The use of such finely divided particulate materials has been found to be effective in maintaining a dispersion of the polymerising material in the inert organic liquid medium in the form of deflocculated particles until the polymerisation has been completed. The resulting particulate product can be readily isolated from the organic medium and can be obtained as products of high molecular weight. The preferred products of the invention have a molecular weight corresponding to a melt flow index measured according to ASTM D 1238 using a 5.0 kg load at 340° C., with a die diameter of 1.18 mm and a die length of 8 mm, of less than 10 but greater than 0.1, preferably in the range 0.2 to 5 and more desirably in the range 0.25 to 3.0.

The polymers of the invention have exceptionally good levels of mechanical properties when they have been polymerised in a dispersion process using finely divided particulate materials as dispersion stabilisers.

The finely divided, particulate material preferably has an inorganic portion to which organophilic chains are covalently or ionically bonded. A particularly effective material may be derived from naturally occurring layer minerals. The preferred layer minerals are those having a significant layer charge resulting from the presence of cations within the layers and on the faces and edges of the layer minerals. These cations give rise to an exchange capacity enabling organophilic chains to be grafted onto the layer mineral by cation exchange. This exchange is typically achieved using primary or tertiary amines of sufficient chain length to provide organophilicity. Generally, a chain length of at least 8 carbon atoms is required, although longer chain lengths will be required if the exchange capacity of the layer mineral is low.

Suitable layer minerals capable of organophilic modification include the classes mica, vermiculite, smectite and montmorillonite. Smectite and montmorrilonite having a high exchange capacity are particularly suitable. The modification of vermiculite based layers materials to provide organophility is described in British Patent Specification No. 1 076 786. Organophilic layer minerals of the above classes are commercially available under the trade names "Bentone 34' and 'Claytone 40' (both are dimethyl di-n-octadecyl ammonium exchanged bentonites), obtainable respectively from NL Chemicals Ltd and EEC International Ltd, and 'Bentone 38' an organophillic hectorite available from NL Chemicals Ltd.

Although it is preferred that the dispersion stabiliser should be in the form of a preformed additive in which the organophilic chain is associated with the core portion through covalent or ionic bonding it is possible to achieve the dispersion stability at elevated temperatures using a two-component system in which a finely divided inorganic material is used in combination with an organic polymer chain material carrying at least one reactive functional group per chain. It is preferred that the reactive groups of the polymer associate with or react with corresponding reactive functional groups on the surface of the finely divided inorganic material through covalent or ionic bonding. It is preferred that the finely divided inorganic material has itself been treated to give it an organophilic nature. For example, a fumed silica, methylated to provide a measure of hydrophobicity, can be used in conjunction with a polymer containing a functional group. Hydrophobic silicas produced according to the procedures disclosed in British Patent No. 932 753 are paticularly useful.

The polymer carrying the functional grup should have a polymer chain of molecular weight at least 500, and preferably at least 2000, which chain is soluble in the inert organic liquid medium, at least under the conditions of polymerisation. The functional groups and the corresponding functional groups may be chosen from carboxyl, hydroxyl, amino, amido and sulphonic groups. For example, a carboxyl group in the polymeric dispersing group may react with a corresponding hydroxyl group. The corresponding hydroxyl group may be provided by one of the reactants or a partially polymerised product of the reactants or it may be present at the surface of the hydrophobic material. The polymeric dispersing material should have sufficient thermal and chemical stability to remain effective under the polymerisation conditions used.

Although the specially designed block and graft copolymer amphipathic stabilisers of the type described in British Pat. Nos. 1 095 931, 1 095 932, 1 373 531, 1 403 794 and 1 419 199 may be used as the polymer carrying the functional group it is preferred for reasons of cost and convenience to employ simpler random copolymers. Although the mechanism by which these random copolymers contribute in the presence of the inorganic material to stabilisation of the polymeric material being formed is not clear, they may, at least in part, act as precursors for stabilisers which are formed when a reactive group in the random copolymer enters into a reaction with a corresponding reactive group in at least one of the reactants or a partially polymerised product of the reactant or reactants. Additionally or alternatively, the reactive group of the random copolymer may react with a corresponding group on the surface of the inorganic material. The inorganic material may itself become attached to a particle of polymerising material by chemical reaction.

In addition to these possibilities of chemical reaction it is possible that the polymeric stabiliser carrying a reactive group and/or the inorganic material may act as stabilisers by virtue of being physically absorbed on particles of polymerising material.

The polymeric stabilisers used in conjunction with an inorganic material must be able to withstand the appropriate temperature conditions likely to be encountered during the polymerisation. This may be in excess of 250° C. or even 300° C. Whilst materials such as copolymers of olefins and ethylenically unsaturated carboxyl containing monomers are surprisingly effective at temperatures in excess of 250° C., in view of their expected thermal stability level, polymers of greater thermal stability are preferred. Random polymers containing functional groups and having a major proportion of units derived from monomers selected from styrene, substituted styrenes, alkyl methacrylates and acrylates are particularly useful. Thus examples of preferred stabilisers are random copolymers containing at least 50% by weight of units derived from monomers selected from styrene, substituted styrenes, alkyl methacrylates and acrylates and from 1 to 25% by weight, preferaboy 2 to 10% by weight of units selected from ethylenically unsaturated carboxylic acid or carboxylic acid anhydrides, wherein the functional groups may be at least partly neutralised.

The degree of subdivision of the insoluble component in the stabilising system will depend to a large extent on the source of the inorganic material. It is preferable that the surface aea of the particulate material be at least 10m$^2$/g preferably at least 100m$^2$g and more preferably at least 200m$^2$/g. In the case of materials such as fumed silica the surface area may be as high as 300 m$^2$/g and is generally at least 50m$^2$/g. Standard methods can be used to obtain particle surface areas including the BET gas adsorption method (S Braunauer, P H Emmett and E Teller, J Amer Chem Soc., 60, 309, 1938) and preferably an adsorption from soluton method such as dye absorption (Pan Thi Harg, G W Brindley, Clays and Clay Minerals 18, 203, 1970). It is preferable that the surface area of particulate material available within the anisotropic melt forming polymer in the melt form may be of the order of 1 m$^2$g of polymer and that this surface area be achieved using less than 5% by weight of the particulate material and more preferably less than 2.5% by weight with respect to the weight of polymer. At these levels of additive the beneficial improvement in properties can not be attributed to reinforcement by the particulate material.

The particulate materials having at least one dimension of less than 1 micron may be essentially spherical particles such as the high surface silicas produced by flame hydrolysis.

A useful guide to the suitability of a finely divided particulate material for use in the polymerisation process is its dispersibility behaviour in a compatible liquid, particularly the liquid which is to provide the disperse phase in the polymerisation process. The compatibility and degree of dispersion in the liquid can be assessed by measuring the parameters known as "swelling volume" and "settling volume". These may be determined as follows.

In order to measure the swelling volume 10 g of sample are added to 100 milliliters of the chosen liquid in a 100 milliliter graduated measuring cylinder. After allowing to equilibrate for 30 minutes the volume of additive in the cylinder is measured. This is termed the swelling volume. It is desirably at least 20 ml in the chosen liquid, particularly if the liquid is that to be used as the disperse phase in the polymerisation.

The settling volume is assessed by mixing 10 g of the additive in 100 ml of the chosen liquid using a high shear mixer (such as a Silverson mixer). After dilution to provide 1 g of the additive (based on its inorganic content) per 100 ml of liquid 100 ml of the dispersion is placed in a 100 milliliter graduated measuring cylinder. After equilibrium is reached, typically after a convenient period such as 18 to 24 hours, the volume occupied by the sedimented additive is measured. This is termed the settling volume and should be at least 10 ml. For additives of high dispersibility this may be 100 ml (i.e. no observable sedimentation). Materials of such high dispersibility may be further distinguished by repeating the test at a dilution of 0.1 g additive in 100 ml liquid. Although it might be expected that it would be advantageous to minimise the quantities of inorganic material present in the polymerisation so as to minimise the presence of such material in the final product it has been found that any such disadvantage is at least partially offset by an unexpected beneficial effect which arises from the presence of small quantities of inorganic fillers, particularly plate-like fillers in anisotropic melt forming polymers. In these systems the fillers appear to modify the melt rheology of the anisotropic melts in a favourable manner so that enhanced levels of some of the mechanical properties are achieved. Thus although it might be expected that it would be advantageous to use those particulate materials having the highest surface areas, to maximise their effect as stabilisers and minise the quantity required this has not found to be the case in practice when selecting dispersants on the basis of the physical and mechanical properties achieved.

Dispersion of the layer minerals in an organic media in non polar hydrocarbons can be increased by the addition of delamination activators such as methanol, acetone or propylene carbonate and by the use of high shear mixing equipment. High surface area silicas may be colloidally dispersed in organic media using silane coupling agents or using polymeric dispersing agents, for example copolymers as described in British Pat. Nos. 1 095 031; 1 095 932; 1 373 531; 1 403 794 and 1 429 199.

The concentrations of dispersants required to provide adequate dispersion stability is generally in the range 0.025 to 10% by weight of the polymerisable reactants but varies significantly depending on the dispersant chosen. The organophilic layer materials are less effective on a weight basis, generally requiring at least 0.25% to provide a significant beneficial effect. The lower limit is determined to a large extent by the degree of subdivision which can be obtainedand it is likely that maximising the degree of subdivision will enable lower concentrations to be used effectively. The more finely divided fumed silicas show significant contributions to stability at concentrations as low as 0.025% by weight of the polymerisable reactants. The concentration of dispersant can be varied to control the particle size required from the fully polymerised dispersion. The lower the concentrations used the higher the size of particle that can be maintained without flocculation during the polymerisation. Whilst a product suitable for use as a moulding powder (mean size 50 to 1000 microns) can be produced with low concentrations of additives higher concentrations will be required if a stable, deflocculated dispersion of finer particle size is required.

The inert organic liquid in which the reactants dissolve or are dispersed and which act as a heat transfer medium for the reaction must be unreactive towards the reactants, have a boiling point substantially in excess of the reaction temperature used and must have sufficient thermal stability to withstand the conditions required for polymerisation of the reactants. Suitable materials include the terphenyls, particularly hydrogenated terphenyls commercially available under the trade name 'Santotherm'; a eutectic mixture of 73.5 percent diphenyl oxide and 26.5 percent diphenyl, commercially available under the trademark 'Dowtherm' A; mixtures of various polychlorinated polyphenyls such as chlorinated bipheyls typified by those commercially available under the trademark 'Therminol' FR; polyaromatic ethers and mixtures thereof such as those composed of mixtures of meta and para isomers, having boiling ranges in excess of 400° C., tylpical representatives of which are available commercially under the trademark 'Therminol' 77 and paraffin oils. The paraffin oil should be a material, the major part of which should have a boiling point of at least 320° C., although minor amounts of lower boiling materials can be tolerated. Typical paraffin oils are available from Castrol under the trade names 'Whitemor' and 'Puremor' White Oils, from Shell under the trade name 'Pallidex' and from Burmah under the trade name 'Castrol' WOM 14.

Although it is preferred that the polymers of the invention are made by a dispersion polymerisation process using a dispersion aid comprising a finely divided particulate material in which at least 95% by weight of the particulate material has at least one dimension less than 1 micron and preferably less than 0.1 micron it has been found that the mere presence of low levels of particulate material, at concentrations in the range 0.05 to 5% by weight of the polymer composition, can have beneficial effects in lowering melt viscosity and improving the level of mechanical properties obtained. Thus the invention includes compositions of the specified polyesters and 0.05 to 5% by weight of the compositions of the finely divided particulate material whether or not it has been incorporated as a result of being present as a dispersion aid.

A particular advantage of a product according to the invention when made by a dispersion polymerisation process described is that the properties of the product are significantly enhanced in comparison with the same composition made by the conventional melt condensation process. It has been found that a dispersion product can be polymerised at temperatures at least 20° C. below, and up to 40° C. or more, below the temperature at which it is necessary to conduct melt polymerisation of the same product in order to obtain comparable cycle times. This ability to produce the polymer at a lower temperature appears to be a significant reason as to why the dispersion produced product shows advantages over the melt produced product. For example, the colour of the dispersion product is considerably better, being whiter than melt produced product. This is believed to arise from the ability to polymerise at a temperature much further removed from the decomposition temperature of the polymer.

Furthermore, the melt-made material, polymerises at, say, 340° C. compared with 300° C. for dispersion-made material has been found to be more difficult to melt process at 340° C., even though the dispersion-made material is of higher molecular weight.

The polymers of the invention are particularly noteworthy for the very high levels of mechanical properties that can be achieved when the polymers are produced by dispersion polymerisation in the presence of the particulate additives described.

Compositions can be produced having in combination a flexural modulus of at least 11 GPa, and more preferably at least 12 GPa and a tensile strength of at least 200 MPa, and more preferably at least 210 MPa. In a further aspect of the invention these properties can be achieved in combinaion with a flexural strength of at least 200 MPa and desirably at least 230 MPa. The above values are obtained using the methods of ASTM D 790 for flexural modulus and flexural strength, and ASTM D638 for tensile strength. The high levels of flexural modulus achieved are surprising in view of the presence of a high concentration of non-linear component, i.e. isophthaloyl units, in the polymer chain.

In addition to the excellent levels of physical properties achieved the compositions show a much reduced level of fibrillation. Fibrillation can be a problem when shaped articles are formed from thermotropic polymers.

The problem takes the form of stray fibrils hanging from the surface of the shaped article and is a consequence of the strong tendency of the molecules in thermotropic polymers to orient particularly when subjected to shear such as when flowing through a narrow die or channel.

The reactants for use in the process may consist of monomers in which the chain extending oxy-groups of the reactants are present as acetylated groups or alternatively, the non-acetylated diols and hydroxyacids may be acetylated in the presence of the diacid prior to the polymerisation procedure.

The products of the invention are particularly suitable for use as high performance moulding powders or for spinning into high enacity fibres. In these contexts it is important to retain maximum stiffness at elevated temperatures. The compositions of the invention achieve a stiffness level equivalent to that obtained from otherwise similar 3 component system but containing appreciably higher levels of hydroxybenzoic acid.

The invention is further described with reference to the following Examples.

EXAMPLE 1

A 3 liter flanged reaction vesel fitted with a nitrogen inlet, thermocouple, Vigreux column (19 cm) attached to the stillhead, condenser and receiver vessel, impellor was charged with p-acetoxy benzoic acid (303.3 g 1.685 mole), isophthalic acid (245.2, 1.477 mole), hydroquinone diacetate (286.6, 1.477 mole) 2,6-acetoxynaphthoic acid (10.8 g, 0.0468 mole), liquid paraffin (available from BDH as heavy GPR) (636 g), acetic anhydride (20.4 g, 2.4% on monomers), potassium acetate (0.114 g, 134 ppm) and 'Bevaloid' 6420 (as anti-foam) (4.6, 0.55% on monomers). 'Bevaloid' is a registered trade mark. The mixtue was heated to 233 with slow stirring (100 rpm) an $N_2$ flow (300 cc/min) over 45-55 minutes, at which stage acetic acid was beginning to be evolved. 'Claytone' 40 (18.5 g, 2.2%) (an organophilic clay obtainable from N L Chemicals Ltd; 'Claytone' is a registered trade mark) dispersed (by stirring) in liquid paraffin (214 g) at room temperature was added to the reaction mixture whereupon the stirrer speed was increased to 500-650 rpm to disperse the monomers melt in the heat transfer medium. The temperature of the dispersion was increased to 300° C. over 60-70 minutes and acetic acid, (266.2 g, 95%) was evolved. Upon the temperature of the batch reaching 300° C., the $N_2$ flow was increased to 1600 cc/min and the dispersion was stirred for 80 minutes at this temperature. A mixture of the acetic acid and liquid paraffin (23 g) was evolved. The batch was cooled and filtered. The polymer cake was collected, stirred in Genklene ('Genklene' is a registered trade mark) filtered and this was repeated again (some 'Claytone' 40 was present in the 'Genklene' and was decanted from the polymer at this stage). Polymer (533 g, 95%) consisting of cream distorted spheres (30-180 $\mu$m) of melt flow index (MFI) of 2.0 (according to ASTM D 1238—using a 5.0 kg load at 340° C., die diameter 1.18 mm and the length 8 mm). The polymer exhibited liquid crystalline behaviour over the temperature range 320° to in excess of 400° C.

EXAMPLE 2

A 3 liter flanged reaction vessel fitted with $N_2$ inlet, thermocouple, reflux condenser and impellor was charged with p-hydroxybenzoic acid (234.9 g, 1.70 mole), hydroquinone (163.8 g, 1.49 mole), 2,6-hydroxynaphthoic acid (8.9 g, 0.048 mole), isophthalic acid (247.2 g, 1.49 mole), anhydrous potassium acetate (0.12, 180 ppm) and acetic anhydride (506.29 g, 4.96 mole).

The mixture was heated to reflux (145°) with slow stirring (60 rpm) and slight $N_2$ flow (60 cc/min). After 100 mins at reflux, the reflux condenser was replaced by a Vigreux column (36 cm) attached to the stillhead, condenser and receiver vessel. The reaction temperature was brought up to 170° C. over 25 mins, allowing 210 ml of acetic acid to distill over. Then ambient liquid paraffin (BDH, heavy GPR) (657 g), and Bevaloid6420 (6 g) were added, resulting in some precipitation of acetylated monomers. The mixture was heated to 240° C., with slow stirring (60 rpm) and nitrogen flow (130 cc/min) over 40 mins, reducing the heat input if the vapour head temperature exceeded 120° C. At 240° C. a total of 315 g of acetic acid distillate had been collected. Claytone 40 (18.8 g) dispersed (by stirring) in liquid paraffin (200 g) at ambient temperature, was added to the reaction mixture (at 240° C.) and the stirrer speed increased to 550 rpm to disperse monomer melt in heat transfer medium. The reaction temperature was increased to 300° C. over 45-60 mins with nitrogen flow (250-300 cc/min), reducing the heat input if the vapour head temperature exceeded 120° C., (total acetic acid distillate 555 g on reaching 300° C.).

The reaction temperature was maintained at 300° C. for 105 mins, with nitrogen flow 650 cc/min initially, increased to 1000 cc/min after 30 mins and further increased to 1500 cc/,in during the final 45 mins at 300° C. Total acetic acid distillate collected during the reaction was 570 g. (Some liquid paraffin was also distilled over).

The batch was cooled and filtered. The polymer was stirred in Genklene, filtered, reslurried in acetone ('Claytone' 40 present in the Genklene was separated from polymer by decanting), filtered and dried.

Light creamy-yellow coloured polymer (30-150$\frac{1}{2}$m, spheres) of MFI 1.5 (2.5 kg at 340° C.) was obtained. (The ratio of acetylated monomers ABA, ANA, HQDA and IA to the liquid paraffin heat transfer medium was 1:1 wt/wt in this reaction). The polymer exhibited the same liquid crystalline melt behaviour as the polymer of Example 1.

EXAMPLE 3

The processability of the product of Example 1 was evaluated in comparison with a sample made by the same procedure but not having any oxynaphthoic component. The comparison copolyester was made from 0.36 moles of p-acetoxy benzoic acid and 0.32 mole of each of hydroquinone diacetate and isohthalic acid.

The test used for assessing processability was the spiral flow test. An Ankerwerke injection moulding machine (model A36) was used to injection mould the melt. The injection was done at a melt temperature as indicated in the table, a melt pressure of 116 MPa, an injection speed setting of 23 and an injection time of 15 seconds. The mould temperature was 40° C.

The results are recorded in the following table.

| SPIRAL FLOWS (INJECTION PRESSURE 1900 PSI INJECTION SPEED 23) | | |
|---|---|---|
| Temp. | $HBA_{.36}IA_{.32}HQ_{.32}$ Spiral Length | $HBA_{.36}IA_{.315}HQ_{.315}HNA_{.01}$ Spiral Length |
| 340 | 45 | 78 |
| 330 | 32 | 57 |
| 320 | 20 | 44 |

-continued

| SPIRAL FLOWS (INJECTION PRESSURE 1900 PSI INJECTION SPEED 23) | | |
|---|---|---|
| Temp. | HBA.36IA.32HQ.32 Spiral Length | HBA.36IA.315HQ..315HNA.01 Spiral Length |
| 310 | | 25 |

The spiral mould tool was in the form of a rectangular channel (2 mm thick×10 mm wide×1000 mm long formed into a flat spiral radiating from a central sprue gate.

These results indicate that the polymer of the invention has the same processability at 320° C. as the three component polymer has at 340° C. This extra margin of processability is particularly important when it is appreciated that significant polymer degradation begins at temperatures above 350° C. for these polymers. The polymers of the invention thus provide a more robust polymer in the sense that the processing conditions do not have to be so accurately controlled because they can be melt processed well below the degradation temperature. Thus it has been observed in the MFI test that the extruded products of both 3 component and 4 component polymers exhibit a darkening in colour if extruded at temperatures in excess of 350° C. The emerging lace contains bubbles indicating degradation.

The improved processability of polymer of the invention is also indicated by DSC examination of the temperature at which the material crystallises (onset of crystallinity) and the temperature at which a melt of polymer sets up on cooling as indicated by a rapid rise in the viscosity of the melt. The following table compares the effect on "setting up" temperature on the composition of the polymer.

| THE EFFECT OF HNA ON RECRYSTALLISATION TEMP AND MELT VISCOSITY | | |
|---|---|---|
| Composition | Temp °C. at which crystallisation starts on cooling (DSC) | Temp at which melt sets up on cooling |
| HBA.36IA.32HQ.32 | 301 | 294 |
| HBA.36IA.315HQ.315HNA.01 | 286–290 | 284 |
| HBA.35IA.325HQ.325 | 298 | 295 |
| HBA.35IA.32HQ.32HNA.01 | 280 | 279 |

EXAMPLE 4

A range of polymers having the compositions indicated in the table below were prepared according to the procedure of Example 1.

The degree of maintenance of stiffness with increasing temperature of the polymers was determined by Dynamic Mechanical Analysis. The results detailed in this specification were determined using a Du Pont 981 Dynamic Mechanical Analyser (DMA) controlled by a Du Pont 990 Thermal Analyser.

Test samples were obtained by injection moulding the composition under test into a tensile bar suitable for measurement of tensile strength according to ASTM D 638. The tabs at the ends of the tensile bar, that is excluding the portion of reduced width, were cut off for use as the test pieces.

After mounting the test samples in the instrument, the DMA was scanned at 10° C./min from −120° C. to the melting point of the sample. The signals recorded by the DMA were vibration frequency f (hz) and damping signal V (mV). These signals were converted to Young's modulus $E'$ and Loss Modulus $E''$ by the following formulae:

$$E' = \frac{(4\pi^2 f^2 J - K)}{2W\left(\frac{L}{2} + D\right)^2} \cdot \frac{(L)^3}{(T)}$$

$$\tan \delta = \frac{CV}{f^2}$$

$$E'' = E' \tan \delta$$

where
W = sample width
L = sample length
T = sample thickness
J, K, D, V are instrumental factors which were determined according to the instruction measure of the instrument manufacturer.

The percentage normalised DMA stiffness at 180° C. (relative to 0° C.) is obtained by dividing the stiffness ($E'$) at 180° C. divided by the stiffness at 0° C. and expressing it as a percentage.

The Tg recorded from the DMA trace is obtained by the straight line extrapolations of those portions of the trace below and above the onset of the fall in stiffness. The intersection of these two lines is taken as a measure of the Tg.

TABLE I

| Composition | | | | % Normalised DMA Stiffness at 180° C. (Relative to 0° C.) | Normalised DMA Stiffness at 180° C. - after 24 hr anneal at 250° C. | Tg DMA °C. | Temp at which DMA stiffness has fallen to 50% of 0° C. stiffness | % Crystallinity (by wide angle diffraction) after 24 h anneal at 250° C. | Tm, DSC | Tg DSC |
|---|---|---|---|---|---|---|---|---|---|---|
| HBA | IA | HQ | HNA | | | | | | | |
| 27.5 | 36.25 | 36.25 | — | 14.8 | — | 137 | 138 | 24.2 | 336 | 136 |
| 30 | 35 | 35 | — | 16.4 | — | 137 | 137 | — | 337 | 130 |
| 33.3 | 33.3 | 33.3 | — | 16.7 | — | 129 | 129 | — | 332 | |
| 35 | 32.5 | 32.5 | — | 15.5 | — | 127 | 128 | — | 334 | |
| 35 | 32 | 32 | 1 | 13.5 | — | 122 | 125 | — | 332 | |
| 36 | 32 | 32 | — | | 26.9 | | | 17.3 | 334 | 127 |
| 36 | 31.5 | 31.5 | 1 | 14 | 19.6 | 124 | 124 | 12.6 | 324 | 125 |
| 40 | 30 | 30 | — | 15.2 | 24 | 118 | 124 | — | 335 | |
| 45 | 27.5 | 27.5 | — | 13.9 | 19.5 | 111 | 118 | 8.1 | No endotherm | 119 |
| 50 | 25 | 25 | — | 12.1 | 19.3 | 110 | 116 | 8.7 | No endo- | 114 |

TABLE I-continued

| Composition | | | | % Normalised DMA Stiffness at 180° C. (Relative to 0° C.) | Normalised DMA Stiffness at 180° C. - after 24 hr anneal at 250° C. | Tg DMA °C. | Temp at which DMA stiffness has fallen to 50% of 0° C. stiffness | % Crystallinity (by wide angle diffraction) after 24 h anneal at 250° C. | Tm, DSC | Tg DSC |
|---|---|---|---|---|---|---|---|---|---|---|
| HBA | IA | HQ | HNA | | | | | | | |
| 34.2 | 30.4 | 30.4 | 5 | 0 | — | 120 | 123 | | therm No endotherm | |

The results indicate the percentage retention of stiffness for a sample containing 1 mole % hydroxynaphthoic acid (HNA) and having 36 mole % of hydroxybenzoic acid (HBA) is at least as good as for three component polymers containing 45 or 50% of hydroxybenzoic. This is also true of samples that have been annealed. Crystallinity measurements, using wide angle diffraction, on annealed samples (24 hr at 250° C.) indicates a higher crystallinity for the 1 mole % HNA/36 mole HBA combination in comparison with the three component systems containing 40 to 50% HBA. This correlates with the stiffness retained at 180° C.

The Tg drops with increasing HBA content.

In summary, these results indicate that the presence of low levels of HNA enable compositions to be obtained having stiffness at elevated temperatures equivalent to the stiffness obtained from 3 component compositions having substantially more of the relatively expensive HBA component.

EXAMPLE 5

The following compositions (expessed in mole %) containing alternatives to the oxynaphthoyl moieties used in the previous Examples have been prepared by adapting the polymerisation procedure described in Example 1.

| Composition | | | | Melting Point (T_m °C.) | % Normalised Stiffness at 180° C. |
|---|---|---|---|---|---|
| HBA | IA | HQ | 4th Component | | |
| 37 | 31.5 | 31.5 | Nil | 329 | 16 |
| 36 | 32 | 31 | 1.0 Bis S | | |
| 36 | 32 | 31 | 1.0 Bis A | 317 | 12 |
| 36 | 32 | 30 | 2.0 m-HQ | 310 | |
| 36 | 32 | 30 | 2.0 m-AP | 305 | |

The abbreviations used in this table correspond to the following ingredients.
HBA: hydroxybenzoic acid
HQ: hydroquinone
Bis S: bis-phenol S
Bis A: bis:phenol A
m-HQ: meta hydroquinone
m-AP: meta amino phenol

EXAMPLE 6

Using the procedure of Example 1 a number of compositions of different melt flow index were prepared. These were evaluated to determine their flexural modulus according to ASTM D 790 and tensile strength according to ASTM D 638. The test samples were moulded in an Arburg Allrounder 220-90-350 injection moulding machine using the following operating conditions.

| Temperatures | Feed zone 320° C. | Sensor Zones 330° C.  330° C. | Nozzle 340° C. |
|---|---|---|---|
| Mould Temperature | 40° C. | | |
| Screw Speed | 450 rpm | | |
| Back Pressure | 500 bar (melt) | | |
| Injection Time | 7 secs | | |
| Hold on Time | 10 secs | | |
| Cooling Time | 20 secs | | |

The following properties were obtained.

| MFI (5 kg at 340°) | Flexural Modulus GPa | Tensile Strength |
|---|---|---|
| 4.2 | 12.7 | 221 |
| 2.5 | 13.0 | 232 |
| 2.1 | 13.0 | 242 |
| 0.8 | 13.3 | 237 |

We claim:
1. A melt processable aromatic copolyester comprising moieties I, II and III having the structural formulae

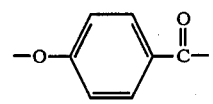

I

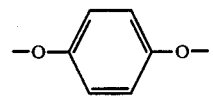

II

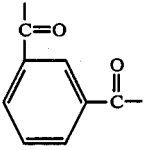

III and at least one moiety IV selected from those of formula

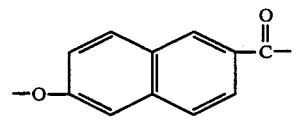

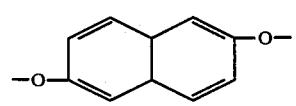

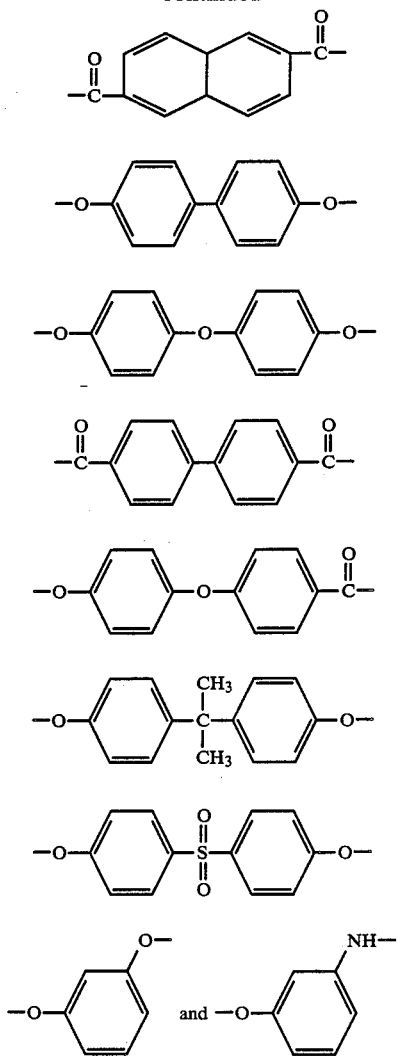

wherein the polyester comprises at least 15 mole %, and less than 40 mole % of moieties I, at least 57.5 mole % and less than 84.75 of moieties II and III taken together, the number of moieties II being substantially equal to the number of moieties III and at least 0.25 mole % and less than 2.5 mole % of moieties IV.

2. A melt processable aromatic opolyester according to claim 1 wherein the polyester contains at least 27 mole % of moiety I.

3. A melt processable aromatic copolyester according to claim 1 wherein the concentration of moiety IV is between 0.5 and 2.0 mole %.

4. A melt processable aromatic copolyester according to claim 1 which contains a finely divided particulate material having at least 95% by weight of particles with at least one dimension less than 1 micron the concentration of particulate material being between 0.05 and 5.0% by weight of the total weight of copolyester and particulate material.

5. A melt processable aromatic copolyester according to claim 4 wherein the copolyester has been produced in a dispersion polymerisation process.

6. A melt processable aromatic copolyester according to claim 4 in which the particulate material was present as a dispersion aid in the dispersion polymerisation process.

7. A melt processable aromatic copolyester according to claim 1 in which the melt flow index of the polymer measured according to ASTM D 1238 using a 5 kg load at 340° c. with a die diameter of 1.18 mm and a die length of 8 mm is between 0.1 and 10.

8. A melt processable copolyester according to claim 1 which has a tensile strength measured according to ASTM D 638of at least 200 MPa and a flexural modulus measured according to ASTM D 790 of at last 11 GPa.

9. A melt processable copolyester according to claim 8 in which the copolyester has a tensile strength of at least 210 MPa and a flexural modulus of at last 12 GPa.

10. A melt processable copolyester according to claim 8 in which the copolyester has a flexural strength measured according to ASTM D 790 of at least 200 MPa.

* * * * *